(12) United States Patent
Clemente et al.

(10) Patent No.: US 10,492,042 B2
(45) Date of Patent: Nov. 26, 2019

(54) METHOD FOR DETERMINING THE PARKING SPACE OF A VEHICLE

(71) Applicant: SKIDATA AG, Grödig/Salzburg (AT)

(72) Inventors: Jorge Clemente, Puch bei Hallein (AT); Peter Schönleitner, Bürmoos (AT)

(73) Assignee: SKIDATA AG, Grödig/Salzburg (AT)

( * ) Notice: Subject to any disclaimer, the term of this patent is extended or adjusted under 35 U.S.C. 154(b) by 0 days.

(21) Appl. No.: 16/200,699

(22) Filed: Nov. 27, 2018

(65) Prior Publication Data

US 2019/0200186 A1    Jun. 27, 2019

(30) Foreign Application Priority Data

Dec. 27, 2017 (EP) ..................... 17210680

(51) Int. Cl.
*H04W 4/44* (2018.01)
*H04W 4/029* (2018.01)
*G08G 1/14* (2006.01)
*H04W 4/48* (2018.01)

(52) U.S. Cl.
CPC ............ *H04W 4/44* (2018.02); *G08G 1/144* (2013.01); *H04W 4/029* (2018.02); *H04W 4/48* (2018.02)

(58) Field of Classification Search
None
See application file for complete search history.

(56) References Cited

U.S. PATENT DOCUMENTS

| | | | |
|---|---|---|---|
| 8,498,805 B2 | 7/2013 | Joong et al. | |
| 2013/0290045 A1 | 10/2013 | Levy et al. | |
| 2015/0154868 A1 | 6/2015 | Neuner et al. | |
| 2016/0196747 A1* | 7/2016 | Tsyrklevich | ........... G08G 1/143 701/532 |
| 2016/0242008 A1* | 8/2016 | Tu | ........................ H04W 4/40 |

FOREIGN PATENT DOCUMENTS

| | | |
|---|---|---|
| DE | 102008006356 A1 | 7/2009 |
| DE | 102012212347 A1 | 1/2014 |
| DE | 102012023621 A1 | 5/2014 |
| DE | 102013203909 A1 | 9/2014 |
| DE | 102016106513 A1 | 10/2017 |
| EP | 2469303 A1 | 6/2012 |
| FR | 2975517 A1 | 11/2012 |

OTHER PUBLICATIONS

European Search Report issued in corresponding European Patent Application No. 17210680.9 dated Jul. 18, 2018.

* cited by examiner

*Primary Examiner* — John F Mortell
(74) *Attorney, Agent, or Firm* — Davis & Bujold PLLC; Michael J. Bujold

(57) ABSTRACT

A method for determining a parking space (7) of a vehicle (3). The method comprises determining a location, at which a mobile electronic device (6) located in the vehicle transitions from a vehicle movement profile to a pedestrian movement profile, as the parking space (7) of the vehicle (3).

7 Claims, 1 Drawing Sheet

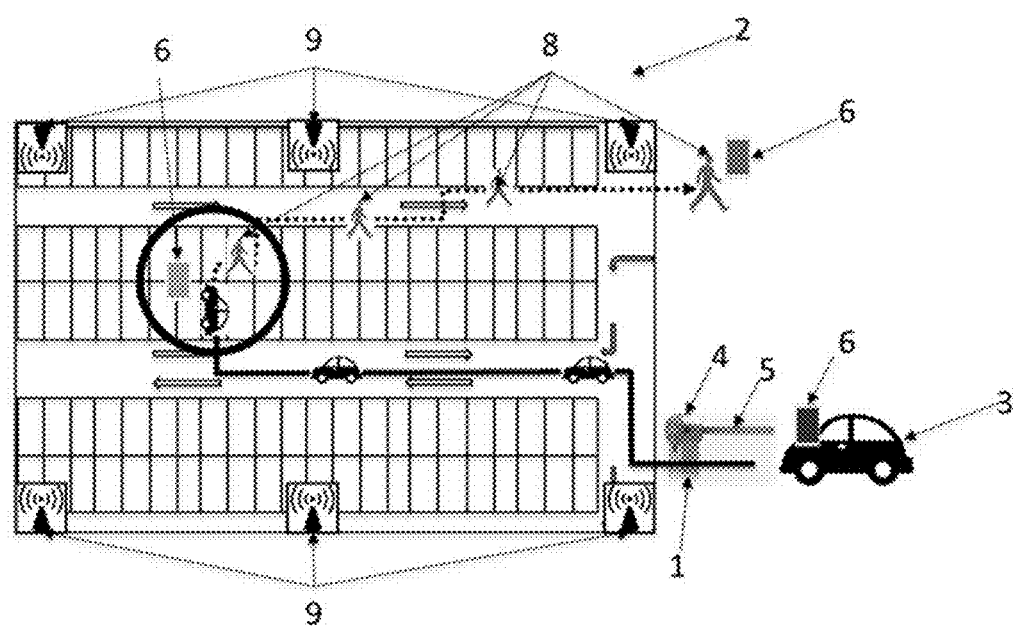

METHOD FOR DETERMINING THE PARKING SPACE OF A VEHICLE

This application claims priority from European patent application serial no. 17210680.9 filed Dec. 27, 2017.

FIELD OF THE INVENTION

The present invention relates to a method for determining the parking space of a vehicle.

BACKGROUND OF THE INVENTION

Methods for determining the parking space of a vehicle in a multi-storey car park or in a car park are known from the prior art. Here, a sensor is generally assigned to each parking space, which sensor detects a parked vehicle. Furthermore, it may be provided that vehicles in a multi-storey car park are identified on the basis of the sound profile emitted by the drivetrain in at least one speed range, wherein the parking space of a vehicle is the location of the last localization of the vehicle with the drive unit running. Furthermore, it is known from the prior art to determine parking spaces of vehicles by means of cameras. A plurality of suitable sensors or cameras are disadvantageously required for carrying out the above-mentioned methods.

Consequently, the determination of the parking space of vehicles takes place according to the methods known from the prior art by means of the infrastructure of the car park or the multi-storey car park, wherein further steps are required for forwarding the information to the vehicle driver.

SUMMARY OF THE INVENTION

The present invention is based on the object of specifying a method for determining the parking space of a vehicle.

This object is achieved by means of the features of independent claims. Further embodiments and advantages emerge from the dependent claims.

Accordingly, a method for determining the parking space of a vehicle is suggested, in the context of which, the location, at which a mobile electronic device located in the vehicle transitions from the movement profile in a vehicle—termed the vehicle movement profile in the following—to a pedestrian movement profile, is determined as the parking space of the vehicle. The parking space may be displayed on a map for example.

The differentiation between the vehicle movement profile and the pedestrian movement profile takes place by means of an analysis of the data of the sensors of the mobile electronic device, for example by means of the data of an accelerometer, a compass, a magnetic sensor, a vibration sensor and/or a light sensor by means of suitable software in the mobile electronic device, or else by means of analysis of the movement profile itself, such as e.g. speed, movement on the road, in pedestrianized areas, and the like.

For the case of a parking space outside or for the case of a multi-storey car park with satellite reception for the GPS module of the mobile electronic devices, the location, at which the mobile electronic device transitions from the vehicle movement profile to a pedestrian movement profile, is determined on the basis of the GPS data of the GPS module of the mobile electronic device at this time, i.e. at the time at which the mobile electronic device transitions from the vehicle movement profile to a pedestrian movement profile. In this case, tracking of the vehicle takes place on the basis of data of the GPS module of the mobile electronic device. The determination of the parking space takes place here in the mobile electronic device. Instead of a GPS signal, any suitable GNSS (Global Navigation Satellite System) signal, for example a Galileo or GLONASS signal, in connection with a suitable receiver module may be called upon.

For the case of a parking space without GPS coverage, particularly a multi-storey car park, in which no satellite reception for the GPS module of the mobile electronic devices is present, the location, at which the mobile electronic device transitions from the vehicle movement profile to a pedestrian movement profile, is determined on the basis of tracking of the mobile electronic device, preferably by means of means, which are connected to a server, for detecting mobile electronic devices by means of a standard for wireless communication. Here, the mobile electronic device sends a signal, which is received by means for detecting mobile electronic devices, at periodic intervals or after receiving a signal sent by the means for detecting mobile electronic devices.

For example, the tracking may take place by means of WLAN or by means of the BLE or a UWB standard. The parking space here corresponds to the location of the localization of the mobile electronic device at the time of the transition of the mobile electronic device from the vehicle movement profile to a pedestrian movement profile. If tracking is carried out by means of means, which are connected to the server, for detecting mobile electronic devices, the tracking data are transmitted by means of the standard for wireless communication to the mobile electronic device, wherein the tracking data are assigned to the movement profile as a function of time in the mobile electronic device, as a result of which the parking space can be determined.

Here, the tracking or the localization of the mobile electronic devices takes place for example in that the spacing between the mobile electronic device and means for detecting mobile electronic devices, which can be realized e.g. as BLE, UWB or WLAN transceiver units, is determined on the basis of a reference signal strength, which generally corresponds to the signal strength at a distance of one metre and which is contained as information in the signal of the mobile electronic device or is stored in a table saved on a computer as a function of the mobile electronic device, e.g. model of the mobile telephone, wherein a trilateration, or in the case of more than three transceiver units, multilateration is subsequently carried out.

Alternatively, signal transmitters may be provided in accordance with a standard for wireless communication, which may for example be realized as BLE, UWB or WLAN signal transmitters, which send signals at predetermined time intervals, which are received by the mobile electronic devices and analysed in the mobile electronic devices, e.g. by means of an app. Here, in the mobile electronic device by means of the app, within range of a signal transmitter, the signal transmitter is identified on the basis of a Universally Unique Identifier (UUID) of the transmitter and the signal strength is measured. If signals are received from at least three signal transmitters, the position of the mobile electronic device in two-dimensional space can be calculated in the mobile electronic device by means of trilateration or by means of a fingerprinting method.

According to a development of the invention, tracking of the mobile electronic device can also take place by means of means for detecting mobile electronic devices or by means of BLE, UWB or WLAN signal transmitters via a communication standard for wireless communication, when a GPS signal is present and analysed, as a result of which the accuracy of the method is increased.

Here, the tracking data of the GPS signal, termed GPS data in the following and the data from tracking by means of means for detecting mobile electronic devices or by means of BLE, UWB or WLAN signal transmitters are saved in the mobile electronic device as a function of time on the basis of the respective timestamp. For this purpose, the data from tracking by means of means for detecting mobile electronic devices are transmitted by the server to the mobile electronic device by means of the means for detecting mobile electronic devices.

If the GPS data and the tracking data via means for detecting mobile electronic devices or via BLE, UWB or WLAN signal transmitters have the same timestamp, which has a low probability of occurring, it is assumed that the GPS signal has the higher accuracy. By combining the signals of both methods, a tracking sequence is provided, which has twice as many signals as a tracking sequence created on the basis of one of the methods.

In the event of a discrepancy between the GPS data and tracking data obtained by means of means for detecting mobile electronic devices or by means of BLE, UWB or WLAN signal transmitters, which discrepancy exceeds a predetermined threshold value, it is assumed that the GPS data are more accurate outside and the tracking data obtained by means of means for detecting mobile electronic devices or by means of BLE, UWB or WLAN signal transmitters are more accurate in a building, e.g. in a multi-storey car park, so that only these data are called upon.

To increase the accuracy of the determination of the parking space of the vehicle, it is also possible to call upon the movement profile of the vehicle, which is obtained on the basis of the GPS data of the mobile electronic device and/or on the basis of the tracking of the mobile electronic device by means of means for detecting mobile electronic devices or by means of BLE, UWB or WLAN signal transmitters.

Here, the GPS data and/or the tracking data by means of means for detecting mobile electronic devices or by means of BLE, UWB or WLAN signal transmitters are analysed in the mobile electronic device as a function of time, wherein, if the data deviate from one another by less than a predetermined threshold value in an applicable time interval, it is assumed that these tracking data, termed vehicle standstill data in the following, correspond to a potential parking space of the vehicle. In the context of a development, a check is made as to whether the vehicle standstill data correspond to a forwards and backwards movement, carried out alternately, below the predetermined threshold value, wherein if this is the case, it is assumed that these movements are, with high probability, a parking process, so that the vehicle standstill data correspond with high probability to the parking space of the vehicle.

If, as explained previously, the location at which the mobile electronic device transitions from the vehicle movement profile to a pedestrian movement profile is then determined, and this location corresponds to the vehicle standstill data with a predetermined deviation, this location is determined as the parking space of the vehicle.

According to a development of the invention, for the case of a car park or a multi-storey car park, it is possible to recognize at the entrance, by means of means for detecting mobile electronic devices via a communication standard for wireless communication, whether a mobile electronic device is located in the vehicle, wherein if a mobile electronic device is located in the vehicle, this mobile electronic device is assigned in a database, which is connected to a server, to the vehicle in which the mobile electronic device is located. This, i.e. the linking of a mobile electronic device to a vehicle, can for example take place by means of the detection of a unique feature of the vehicle, for example the registration number of the vehicle and linking the detected feature, e.g. the registration number, with a unique ID of the mobile electronic device sent by means of the communication standard and detected by the means for detecting mobile electronic devices. The means for detecting mobile electronic devices by means of the communication standard for wireless communication may for example be RFID, BLE, UWB or WLAN transceiver units.

Here, after linking the vehicle with the mobile electronic device, a connection for wireless data communication via a communication standard, for example via GSM or WLAN, is produced between the mobile electronic device and a server, wherein the parking space determined according to the described method is transmitted to the server by means of this connection.

By means of the conception according to the invention, a method for determining the parking space of a vehicle is provided, which method has minimal hardware requirements. The data required for carrying out the method are generated and analysed in the mobile electronic device.

BRIEF DESCRIPTION OF THE DRAWING

The invention is explained by way of example in more detail in the following on the basis of the attached FIGURE on the basis of determining the parking space of a vehicle in a multi-storey car park without GPS coverage.

DETAILED DESCRIPTION OF THE PREFERRED EMBODIMENTS

In the attached FIGURE, an entrance to a multi-storey car park 2 is labelled with 1, at which entrance an access control device 4 comprising a barrier boom 5 is provided; a vehicle, which is standing at the entrance 1, is labelled with the reference number 3, wherein a mobile electronic device 6 is located in the vehicle 3.

According to the invention, the location 7, at which the mobile electronic device 6 transitions from a vehicle movement profile to a pedestrian movement profile, is determined as the parking space of the vehicle 3. In the FIGURE, the driver 8 exits the vehicle 3 at the parking space 7 and then moves on foot, wherein they carry the mobile electronic device 6 with them. The differentiation between the vehicle movement profile and the pedestrian movement profile takes place by means of an analysis of the data from sensors of the mobile electronic device 6, by means of suitable software in the mobile electronic device 6.

The parking space 7 of the vehicle, i.e. the location at which the mobile electronic device 6 transitions from the vehicle movement profile to a pedestrian movement profile, is determined in the example shown on the basis of tracking of the mobile electronic device 6 by means of means 9 for detecting mobile electronic devices by means of a standard for wireless communication, for example by means of BLE; the parking space 7 corresponds to the location of the localization of the mobile electronic device 6 on the basis of the tracking at the time of the transition of the mobile electronic device 6 from the vehicle movement profile to a pedestrian movement profile. Here, the tracking data are transmitted by means of the standard for wireless communication to the mobile electronic device 6, wherein the tracking data are assigned to the movement profile as a function of time in the mobile electronic device 6, as a result of which the parking space 7 can be determined as the location at which the mobile electronic device 6 transitions from a vehicle movement profile to a pedestrian movement profile.

The invention claimed is:

1. A method for determining a parking space (7) of a vehicle (3), the method comprising:
   determining a location, at which a mobile electronic device (8) located in the vehicle transitions from a vehicle movement profile to a pedestrian movement profile, as the parking space (7) of the vehicle (3);
   determining the transition between the vehicle movement profile and the pedestrian movement profile by analysis of data of sensors of the mobile electronic device (6) by suitable software in the mobile electronic device (8);
   in a case of a parking space outside or in a case of a multi-story car park with satellite reception for a GPS module of the mobile electronic devices (6), determining the location, at which the mobile electronic device (6) transitions from the vehicle movement profile to the pedestrian movement profile, on a basis of GPS data of the GPS module of the mobile electronic device (6) at the time the transition occurs; and
   when determining the parking space (7), in addition to the GPS data of the mobile electronic device (6), determining the location, at which the mobile electronic device (6) transitions from the vehicle movement profile to the pedestrian movement profile, on a basis of tracking of the mobile electronic device by means (9) for detecting mobile electronic devices (6) via a communication standard for wireless communication or by tracking on a basis of signals sent by signal transmitters at predetermined time intervals as a result of which accuracy of the method is increased; and
   comparing the GPS data and tracking data obtained by either the means for detecting mobile electronic devices or by means of BLE, UWB or WLAN signal transmitters to determine a discrepancy between the GPS data and the tracking data, and if the discrepancy exceeds a predetermined threshold value, in the case of the parking space outside, only the GPS data is called upon for determining the location, and, in the case of the parking space in the multi-story car park, only the tracking data is called upon for determining the location.

2. The method for determining the parking space (7) of the vehicle (3) according to claim 1, further comprising, in the case of the multi-story car park without satellite reception for a GPS module of the mobile electronic devices (6), determining the location, at which the mobile electronic device (6) transitions from the vehicle movement profile to the pedestrian movement profile, on a basis of tracking of the mobile electronic device (6) by the means (9), which are connected to a server, for detecting mobile electronic devices (6) by a communication standard for wireless communication,
   transmitting the tracking data by a standard for wireless communication to the mobile electronic device (6), and assigning the tracking data to the vehicle and the pedestrian movement profiles as a function of time in the mobile electronic device (6), as a result of which the parking space (7) is determined.

3. The method for determining the parking space (7) of the vehicle (3) according to claim 1, further comprising, in the case of a multi-story car park without satellite reception for a GPS module of the mobile electronic devices (6), determining the location, at which the mobile electronic device (6) transitions from the vehicle movement profile to the pedestrian movement profile, by signal transmitters which send signals at predetermined time intervals according to a standard for wireless communication, which signals are received by the mobile electronic devices (6) and analysed in the mobile electronic device (6).

4. The method for determining the parking space (7) of the vehicle (3) according to claim 1, further comprising calling upon a movement profile of the vehicle (3), which is obtained on a basis of the GPS data and on a basis of the tracking of the mobile electronic device (6) by the means (9) for detecting mobile electronic devices (6) or by tracking on the basis of signals of signal transmitters, to increase accuracy of the determination of the parking space (7) of the vehicle (3).

5. The method for determining the parking space (7) of the vehicle (3) according to claim 4, further comprising analyzing at least one of the GPS data and the tracking data of the mobile electronic device (6) as a function of time, and, if the data deviates from one another by less than a predetermined threshold value in an applicable time interval, assuming that this data correspond to a potential parking space of the vehicle (3).

6. The method for determining the parking space (7) of the vehicle (3) according to claim 5, further comprising carrying out a check as to whether the data, which correspond to the potential parking space of the vehicle (3), corresponds to a forward and backward movement, carried out alternately, below a predetermined threshold value, and, if this is the case, assuming that these movements are, with high probability, a parking process so that the data, which correspond to a potential parking space of the vehicle (3), corresponds with high probability to the parking space of the vehicle (3).

7. The method for determining the parking space (7) of the vehicle (3) according to claim 1, further comprising recognizing, in the case of a car park or a multi-story car park, at an entrance (1), by means for detecting mobile electronic devices via a communication standard for wireless communication, whether the mobile electronic device (6) is located in the vehicle (3), and, if the mobile electronic device (6) is located in the vehicle (3), this mobile electronic device is assigned in a database to the vehicle (3) in which the mobile electronic device (6) is located, wherein, after linking the vehicle (3) with the mobile electronic device (6), producing a connection for wireless data communication, via a communication standard, between the mobile electronic device (6) and a server, by which the parking space (7) determined is transmitted to the server.

* * * * *